July 29, 1969    T. W. KRAMER III, ETAL    3,458,023
CONVEYOR GATE
Filed July 3, 1967    2 Sheets-Sheet 1
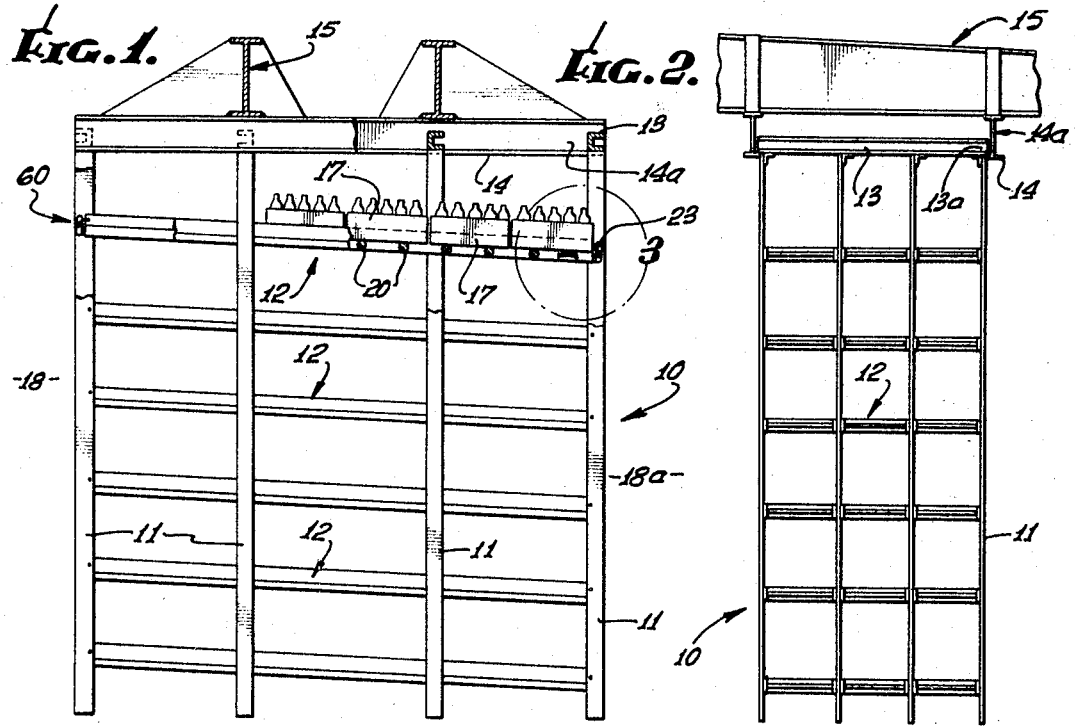
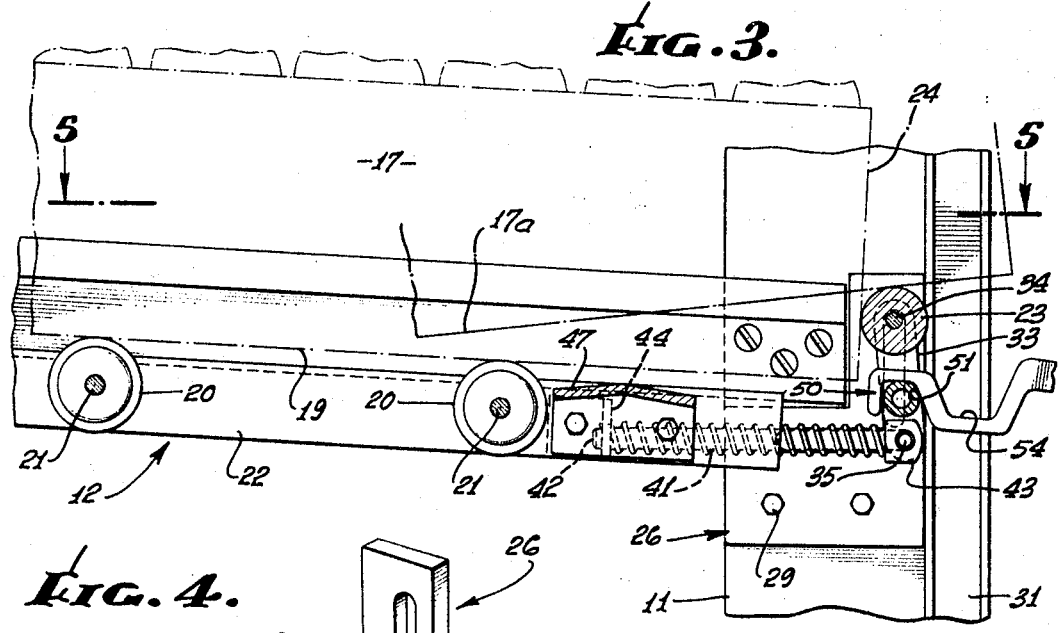
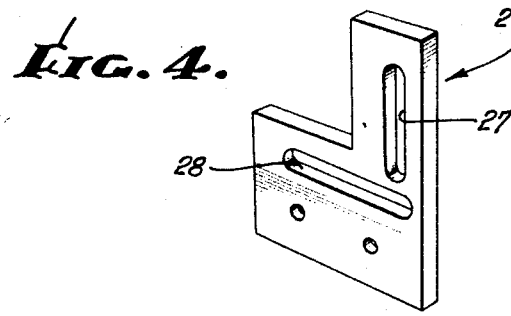
INVENTORS.
THEODORE W. KRAMER III
RICHARD A. O'DONALD
By White & Haefliger
ATTORNEYS.

July 29, 1969  T. W. KRAMER III, ETAL  3,458,023
CONVEYOR GATE
Filed July 3, 1967  2 Sheets-Sheet 2
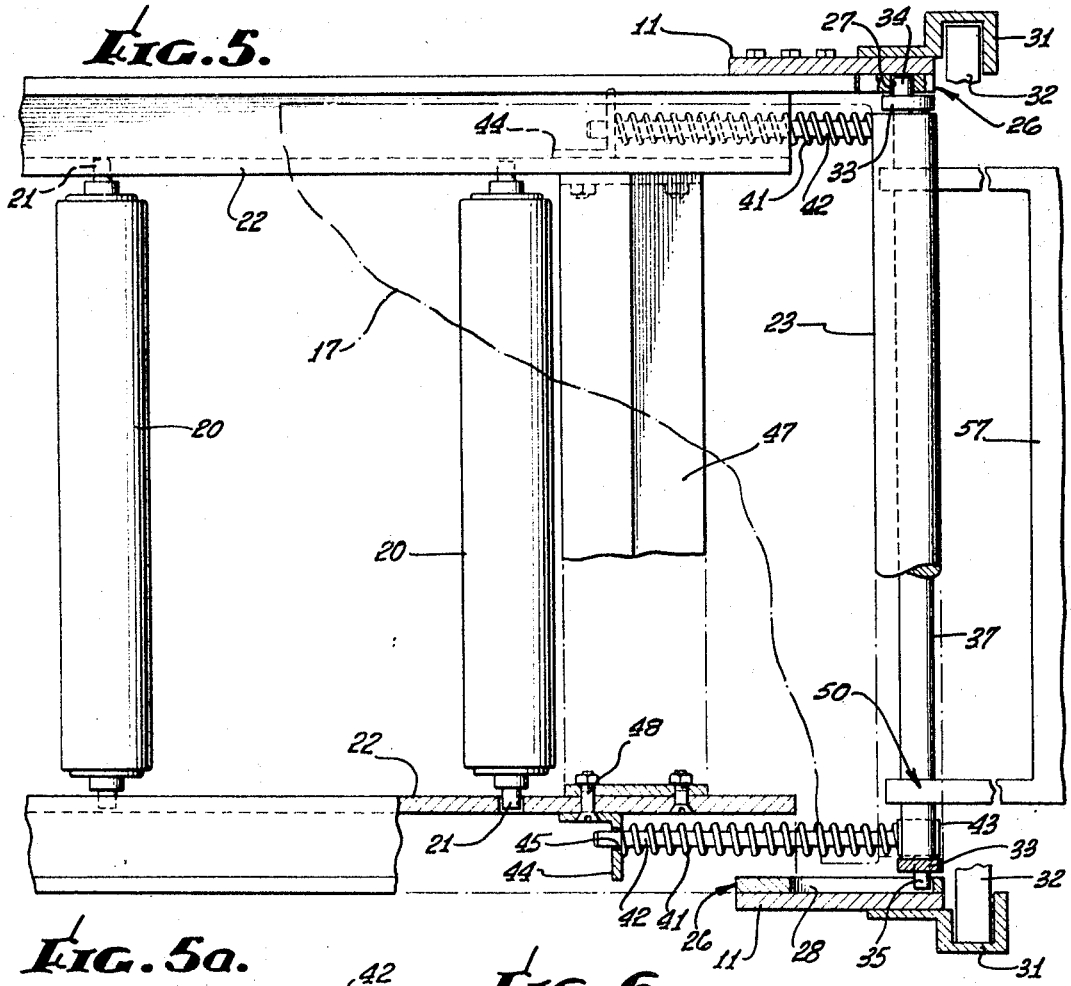
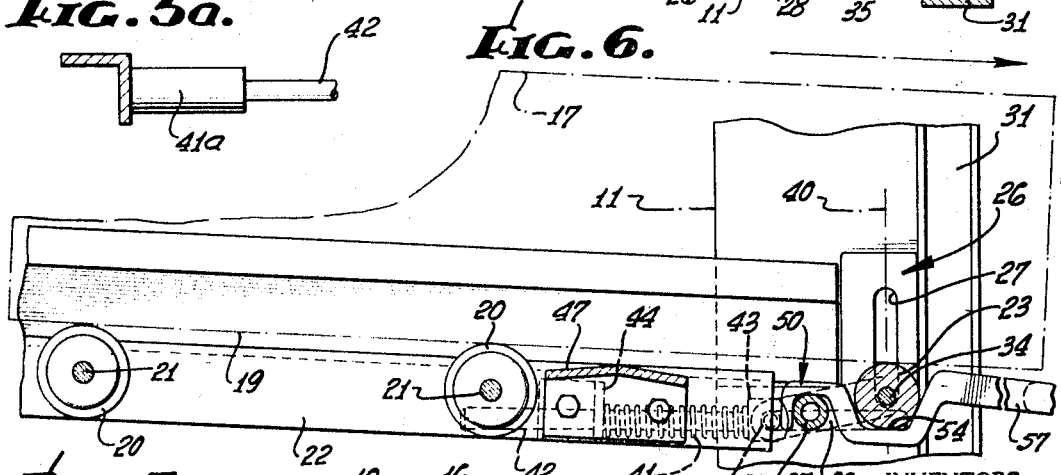
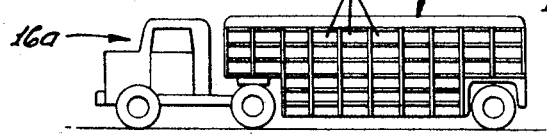
INVENTORS.
THEODORE W. KRAMER III
RICHARD A. O'DONALD
By White & Haefliger
ATTORNEYS.

United States Patent Office 3,458,023
Patented July 29, 1969

3,458,023
CONVEYOR GATE
Theodore W. Kramer III, 6826 Topke, Tucson, Ariz.
85715, and Richard A. O'Donald, Naperville, Ill.;
said O'Donald assignor to said Kramer
Filed July 3, 1967, Ser. No. 650,899
Int. Cl. B65g *13/00*
U.S. Cl. 193—35                                    9 Claims

ABSTRACT OF THE DISCLOSURE

The disclosure concerns gate structure for use in controlling movement of receptacles along a conveyor. The gate is easily movable between up and down positions, in which it is releasably held by actuating and guide structure.

Background of the invention

This invention relates generally to conveyor gates, and more specifically concerns gate control of container case positioning in conveyor chutes, as for example on trailer or truck bodies used in distributing bottled drinks.

In the past, bottle cases have been loaded on delivery truck body decks which extend horizontally. This presents the difficulty of gaining access to the bottle cases stored interiorly of the truck body, and considerable time and effort is expended by the driver or route man in climbing on the truck body and reaching into the interior of the body to gain access to a wanted case. Such effort is particularly burdensome for cases loaded on upper decks. It has been proposed to alleviate this burden by providing a series of conveyor chutes which extend transversely of the truck and which are slanted downwardly, so that the cases gravitate in sequence from the high to the low ends of the chutes. This arrangement enables the driver to unload the cases gravitating to the side of the truck, without having to reach into the truck interior. In order to prevent the cases from dropping off the truck at the low or discharge ends of the conveyors, stops must be provided for arresting case movement at such ends; however, the stops are undesirable when it is desired to automatically unload a series of cases without interrupting their delivery or discharge.

Summary of the invention

It is a major object of the invention to provide apparatus for controlling receptacle or case movement, of such construction and mode of operation as will solve the problem referred to above, as well as other problems in the environment to be described. Basically, the invention comprises a longitudinally extending conveyor chute sized for guiding travel therealong of a sequence of receptacles, the chute having a receptacle support surface defining a plane; a safety gate bodily movable between an up position in which the gate projects above the plane and in the path of receptacle travel, and a down position in which the top of the gate is approximately at the level of the established plane; gate actuating structure; and guide means extending outside said path to guide said structure for swinging movement carrying the gate between up and down positions. Typically, the guide means includes first and second tracks respectively extending in a generally upward direction and at a substantial angle thereto, and the actuating structure includes a link carrying the gate and having spaced guided elements confined by the tracks to move along the latter as the gate moves between up and down positions, and operator means such as a rod carried by the link to receive generally longitudinal force transmission acting to swing the link for moving the gate between up and down positions.

Further, coupling structure may typically be coupled with the operator rod to transmit longitudinal force thereto and a conveyor chute extension connected with the coupling structure to extend in such relation with the conveyor chute that the bottle cases are freely transferable between the main chute and the chute extension when the gate is in down position. In this mode, the conveyor chute may be automatically unloaded without interference by the gate. The latter typically comprises a roller which extends in nested relation with the coupling structure in gate down position, and which rolls as bottle cases travel over the roller in passing between the main chute and chute extension. In up position, the roller rolls assist pulling of the bottle cases one at a time over the gate, as during manual unloading.

Additional objects and advantages of the invention include the provision of dual tracks and links as defined, the links carrying the gate and the operator rod extending between the links; longitudinal tracks oriented to guide the links over center with respect to the upright tracks as the gate moves to up position, together with a spring or springs biasing the actuating structure in a direction such that the gate roller is effectively lockable in up position; frame structure supporting multiple conveyor chutes and gate structure as described; and inclination of the plane defined by the chute to cause the bottle cases or receptacles to slide automatically toward the lower end of the chute structure for interception or non-interception by the gate structure depending upon the operative position of the latter.

These and other objects and advantages of the invention, as well as the details of illustrative embodiments, will be more fully understood from the following detailed description of the drawings, in which:

Brief description of the drawings

FIG. 1 is a side elevation of a frame module or section carrying multiple, inclined, parallel conveyor chutes and gate structures;

FIG. 2 is an end view of the FIG. 1 frame module;

FIG. 3 is an enlarged view of that portion of FIG. 1 shown as encircled by a broken line, and showing gate structure details, the gate being in up position;

FIG. 4 is a perspective showing of a track plate as used in association with the gate structure;

FIG. 5 is a plan view taken on line 5—5 of FIG. 3;

FIG. 5a is a fragmentary showing of a solenoid actuator;

FIG. 6 is a view like FIG. 3, but showing the gate in down position; and

FIG. 7 is a view of a trailer in which multiple frame modules as seen in FIGS. 1 and 2 are incorporated.

Detailed description of preferred embodiment

Referring first to FIGS. 1 and 2, a frame module or rack 10 is shown to include uprights 11 supporting multiple, parallel, conveyor chutes 12 slightly inclined from horizontal. The module 10 includes transverse members 13 at the tops of the uprights and having overhangs 13a suspended by plates 14 of the I-beams 14a, the latter being in turn suspended by the lengthwise extending beams 15. As is clear from FIG. 7, a group of modules or sections 10 are incorporated in a trailer 16 propelled by truck 16a, the beams 14a and 15 being incorporated with the trailer so that the conveyor chutes 12 extend between opposite sides of the trailer. Thus, the operator may load the chutes with bottle cases or receptacles 17 at one side 18 of the trailer (the higher ends of the chutes) and may unload the cases at the opposite side 18a of the trailer. As seen in FIG. 1, the bottle cases 17 travel or gravitate longitudinally on the chutes, and in a downward direction, automatically, during loading and unloading. The cases travel in channels formed between vertically spaced chutes.

Referring now to FIGS. 3–6, each of the chutes has a receptacle support surface or surfaces defining an inclined plane 19, indicated as coextensive with the bottom surfaces of the receptacles 17. Such surfaces are typically defined by the tops of rollers 20 mounted as by axles 21 extending between chute side members 22, between which the receptacles are guided to travel in sequence in a downhill direction. The rollers are spaced longitudinally of the chute and extend tranversely thereof.

Further and in accordance with the invention, a gate, typically in the form of a roller 23, is bodily movable between an up position (as seen in FIG. 3 for example) in which the gate projects above the plane 19 and in the direct path of receptacle travel, and a down position (as seen for example in FIG. 6) in which the top of the gate is approximately at the level of the plane 19. In up position, the gate stops downhill travel of the end case 17 as seen in FIG. 3, as by engagement with the forward end 24 of that case, requiring manual upward deflection of the case to the position indicated by broken lines 17a, in order to unload it over the gate. On the other hand, when the gate is in down position, the cases freely roll over the gate in traveling downhill, and discharge sequentially and automatically, as is clear from FIG. 6.

In accordance with a further aspect of the invention, there is provided what may be characterized as gate actuating structure, and guide means extending outside the case travel path along the chute to guide the actuating structure for swinging movement carrying the gate between up and down positions. Thus, for example, the guide means may typically include transversely spaced sets of tracks formed by plates 26 as seen in FIGS. 4–6. Each set of tracks includes first and second tracks or slots 27 and 28 respectively extending in a generally upward direction and generally longitudinally. The plates 26 are suitably attached as at 29 to the uprights 11, but outside the travel path of the cases or receptacles. Also integral with the uprights 11 as seen in FIG. 5 are vertical channels 31 to receive a door extending across the discharge path of the cases, the door 32 being vertically movable to expose or cover the cases confined in the chute.

The above referred to actuating structure may typically include two transversely spaced links 33 carrying the gate stub axle elements 34. The links also carry guide elements 35. Elements 34 project in and are confined by upright tracks 27, and elements 35 project in and are confined by longitudinal tracks 28, to move therealong as the gate moves between up and down positions. Finally, an operator rod 37 extends transversely between and is carried by the links to receive generally longituidnally directed force transmission acting to swing the links for moving the gate between up and down positions. Note that rod 37 is rigidly connected to the links at points between the guide elements 34 and 35, but typically closer to elements 35 so as to move generally longitudinally when the links are swung.

It will be seen from close examination of FIGS. 3–6 that each of the tracks 28 projects sufficiently on opposite sides of a generally vertical plane 40 defined by the center lines of the first tracks that guide elements 35 in moving rightwardly carry the links over center with respect the first tracks and the plane 40 immediately following movement of the gate roller to up position. In addition, yieldable means is provided to bias the actuating structure in a rightward direction tending to move the guide elements 35 to extreme rightward position as seen in FIG. 3. This combination of over-center movement of the links and biasing of the yieldable means effectively locks the gate in up position, so as not to be driven downwardly when a case 17a is hauled over the roller as seen in FIG. 3. The yieldable means illustrated comprises compression springs 41 mounted on rods 42. The latter have pivot connection at 43 with the links proximate guide elements 35, but on the opposite or inward sides of the links. Also, the rods project through openings 45 in brackets 44 attached to chute side members 22. The springs are confined between brackets 44 and pivot connections 43, as illustrated. FIG. 5a shows use of a solenoid 41a in place of the spring 41.

When the links are swung to FIG. 6 position so that the gate roller is down, the springs 41 have maximum compression for automatically returning the links to swung up position after all the cases have discharged off the conveyor chute. A transverse spacer plate 47 is shown as extending between and connected at 48 to the chute side members 22, for holding the latter and plates 26 in predetermined laterally spaced position, conducive to desired free tracking of the guide members 34 and 35 in the tracks 27 and 28.

Finally, and in accordance with a further aspect of the invention, coupling structure may be coupled with the operator rod 37 to effect generally longitudinal force transmission thereto to swing the gate to down position. Also, a conveyor chute extension is coupled with the coupling structure to extend in such relation with the principal chute 12 that the case or receptacles are freely transferable therebetween when the gate is in down position. In that form of the invention illustrated, the coupling structure comprises one or more hooks 50, transversely spaced apart, to hook over the bar 37 as seen in FIG. 3. The hook 50 has a shoulder 51 extending upwardly at the right side of the bar 37 to push against the latter in a leftward direction, for urging the actuating structure to FIG. 6 position. The coupling structure is also downwardly recessed at 54 with such dimensioning that the roller 23 nests into the recess without interference such as would undesirably restrict rotation of the roller 23 as the cases travel over it.

An example of the conveyor chute extension is seen at 57, extending rightwardly from the roller 23 and chute 12, as illustrated in FIG. 6. Extension 57 travels the discharging cases off the trailer and to an unloading platform, device or surface.

Reference to FIG. 1 will further show the inclusion of gate structure 60 at the upper end of a typical conveyor chute 12, as well as at the lower end of the chute. Such gate structure may have the same construction as that described above, for retaining cases against falling from the upper ends of the chutes.

We claim:
1. In apparatus for controlling receptacle movement,
    a longitudinally extending conveyor chute sized for guiding travel therealong of a sequence of receptacles, said chute having a receptacle support surface defining a plane,
    a gate bodily movable between an up position in which the gate projects above said plane and in the path of said receptacle travel, and a down position in which the top of the gate is approximately at the level of said plane,
    gate actuating structure, and
    guide means extending outside said path to guide said structure for swinging movement carrying the gate between said positions, said guide means including first and second tracks respectively extending in a generally unward direction and at a substantial angle thereto, said actuating structure including a link carrying the gate and carrying spaced guided elements confined by said tracks to move therealong as the gate moves between said positions, and operator means carried by the link to receive generally longitudinal force transmission acting to swing the link for moving the gate between said positions.

2. Apparatus as defined in claim 1 including coupling structure coupled with said operator means to effect said generally longitudinal force transmission thereto, and a conveyor chute extension connected with said coupling structure and extending in such relation with said conveyor chute that said receptacles are freely transferable therebetween when said gate is in down position.

3. Apparatus as defined in claim 2, in which said gate comprises a roller extending in nested relation with said coupling structure in gate down position.

4. In apparatus for controlling receptacle movement,
a longitudinally extending conveyor chute sized for guiding travel therealong of a sequence of receptacles, said chute having a receptacle support surface defining a plane,
a gate bodily movable between an up position in which the gate projects above said plane and in the path of said receptacle travel, and a down position in which the top of the gate is approximately at the level of said plane,
a gate actuating structure, and
guide means extending outside said path to guide said structure for swinging movement carrying the gate between said positions,
said gate comprising a roller extending generally transversely and horizontally, said guide means including transversely spaced sets of tracks, each set including first and second tracks respectively extending in a generally upward direction and generally longitudinally, said actuating structure including two transversely spaced links carrying the gate, each link carrying spaced guide elements confined by the first and second tracks of a set to move therealong as the gate moves between said positions, and an operator rod extending transversely between and carried by the links to receive generally longitudinally directed force transmission acting to swing the links for moving the gate roller between said positions.

5. Apparatus as defined in claim 4, wherein said second tracks project sufficiently on opposite sides of a generally vertical plane defined by said first tracks that certain of the guide elements movable along said second tracks in one longitudinal direction carry said links over center with respect to said first tracks immediately following movement of the gate roller to said up position, and yieldable means biasing said actuating structure in a direction tending to move said certain guide elements in said one longitudinal direction, whereby the gate roller is effectively lockable in up position.

6. Apparatus as defined in claim 4, including multiple apparatus as defined in claim 5, and frame structure supporting said multiple apparatus so that said chutes extend in parallel relation.

7. Apparatus as defined in claim 4 wherein said plane is inclined, said gate being located at the upper end of said chute.

8. Apparatus as defined in claim 4 wherein said plane is inclined, said gate being located at the lower end of said chute.

9. Apparatus as defined in claim 4 including coupling structure coupled with said operator rod to effect said generally longitudinal force transmission thereto, and a conveyor chute extension connected with said coupling structure and extending in such relation with said conveyor chute that said receptacles are freely transferable therebetween when said gate is in down position.

References Cited

UNITED STATES PATENTS

| | | | |
|---|---|---|---|
| 1,669,497 | 5/1928 | Steegmuller | 193—35 |
| 2,306,101 | 12/1942 | Van Zandt | 193—35 |
| 2,980,222 | 4/1961 | Crosby | 193—35 |

ANDRES H. NIELSEN, Primary Examiner